United States Patent
Yusa et al.

(10) Patent No.: US 10,310,317 B2
(45) Date of Patent: Jun. 4, 2019

(54) LIGHT MODULATION ELEMENT UNIT HAVING A LIGHT MODULATING ELEMENT AND IMAGE PROJECTION APPARATUS FOR PREVENTING FOREIGN MATTERS FROM ADHERING TO LIGHT MODULATION ELEMENT

(71) Applicant: CANON KABUSHIKI KAISHA, Tokyo (JP)

(72) Inventors: Koichi Yusa, Utsunomiya (JP); Toshiyuki Noda, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/147,433

(22) Filed: May 5, 2016

(65) Prior Publication Data

US 2016/0337624 A1 Nov. 17, 2016

(30) Foreign Application Priority Data

May 15, 2015 (JP) .................................. 2015-099671

(51) Int. Cl.
*G02F 1/1333* (2006.01)
*G02F 1/1335* (2006.01)
(Continued)

(52) U.S. Cl.
CPC ...... *G02F 1/133382* (2013.01); *G02F 1/1335* (2013.01); *G02F 1/133308* (2013.01);
(Continued)

(58) Field of Classification Search
CPC .................. H04N 9/3144; G03B 21/16; G02F 1/133382; G02F 1/133385;
(Continued)

(56) References Cited

U.S. PATENT DOCUMENTS

| 7,188,956 B2 * | 3/2007 | Otsuka | G03B 21/10 |
| | | | 348/E5.141 |
| 9,341,929 B2 * | 5/2016 | Kadotani | G03B 21/16 |

(Continued)

FOREIGN PATENT DOCUMENTS

| CN | 1658064 A | 8/2005 |
| CN | 102147559 A | 8/2011 |

(Continued)

OTHER PUBLICATIONS

Extended European Search Report issued in European Appln. No. 16001068.2 dated Dec. 20, 2016.

(Continued)

*Primary Examiner* — Bao-Luan Q Le
(74) *Attorney, Agent, or Firm* — Rossi, Kimms & McDowell LLP (57) ABSTRACT

A light modulation element unit includes a light modulation element having a light modulator configured to modulate incident light and a cover glass that covers a light incident surface of the light modulator, a light shielding member, disposed along a surface of the cover glass, which has an opening in which light going to the light modulator passes and a light shield configured to shield light that does not pass the opening, and a heat radiation member provided in a direction different from a direction of the cover glass with respect to the light modulation element. The light shielding member has an extension that extends to outside of the cover glass and faces the heat radiation member. A first gap between the extension and the heat radiation member is smaller than a second gap between the light shield and the surface of the cover glass.

13 Claims, 5 Drawing Sheets

(51) Int. Cl.
*G03B 21/00* (2006.01)
*G03B 21/16* (2006.01)
*H04N 5/74* (2006.01)
*H04N 9/31* (2006.01)

(52) U.S. Cl.
CPC .. *G02F 1/133385* (2013.01); *G02F 1/133509* (2013.01); *G02F 1/133512* (2013.01); *G03B 21/006* (2013.01); *G03B 21/16* (2013.01); *H04N 5/7441* (2013.01); *H04N 9/3102* (2013.01); *H04N 9/317* (2013.01); *H04N 9/3141* (2013.01); *H04N 9/3144* (2013.01); *H04N 9/3152* (2013.01); *G02F 2001/133388* (2013.01)

(58) Field of Classification Search
CPC ......... G02F 1/133308; G02F 1/133512; G02F 1/1335; G02F 1/133509; G02F 2001/133388
See application file for complete search history.

(56) References Cited

U.S. PATENT DOCUMENTS

| | | | | |
|---|---|---|---|---|
| 9,423,676 B2* | 8/2016 | Tsuchiya | | H04N 9/3144 |
| 9,459,484 B2* | 10/2016 | Hirabayashi | | G02F 1/133385 |
| 9,565,407 B2* | 2/2017 | Yusa | | H04N 9/3144 |
| 2002/0015119 A1* | 2/2002 | Takizawa | | G02F 1/133308 349/58 |
| 2002/0018183 A1* | 2/2002 | Ito | | G03B 21/16 353/20 |
| 2002/0131023 A1* | 9/2002 | Shiraishi | | G02F 1/133385 353/57 |
| 2002/0131141 A1* | 9/2002 | Saitoh | | G02F 1/133308 359/245 |
| 2003/0197934 A1* | 10/2003 | Ogawa | | G02B 27/283 359/484.04 |
| 2003/0223045 A1* | 12/2003 | Saitoh | | G02F 1/133308 353/30 |
| 2004/0021830 A1* | 2/2004 | Fujimori | | H04N 9/3144 353/30 |
| 2004/0046940 A1* | 3/2004 | Yanagisawa | | H04N 9/3105 353/31 |
| 2004/0095559 A1* | 5/2004 | Arai | | G03B 21/16 353/57 |
| 2004/0114249 A1* | 6/2004 | Nishihara | | G03B 21/006 359/617 |
| 2004/0130897 A1* | 7/2004 | Kojima | | G02F 1/133308 362/294 |
| 2004/0136146 A1* | 7/2004 | Saitoh | | G02F 1/133308 361/600 |
| 2004/0160548 A1* | 8/2004 | Kojima | | H04N 9/3144 349/58 |
| 2004/0165152 A1* | 8/2004 | Ito | | G03B 21/16 353/30 |
| 2004/0169783 A1* | 9/2004 | Miyashita | | G02F 1/133308 349/58 |
| 2004/0169784 A1* | 9/2004 | Miyashita | | G02F 1/133308 349/58 |
| 2004/0201792 A1* | 10/2004 | Saitoh | | G02F 1/133382 349/58 |
| 2004/0201877 A1* | 10/2004 | Fujimori | | H04N 9/3144 359/245 |
| 2004/0218151 A1* | 11/2004 | Ito | | G03B 21/16 353/57 |
| 2004/0223237 A1* | 11/2004 | Yanagisawa | | G03B 21/16 359/820 |
| 2004/0233548 A1* | 11/2004 | Uehara | | H04N 9/3105 359/819 |
| 2004/0239886 A1* | 12/2004 | Yanagisawa | | H04N 9/3144 353/34 |
| 2004/0246390 A1* | 12/2004 | Yanagisawa | | G02F 1/133385 349/5 |
| 2004/0252253 A1* | 12/2004 | Miyashita | | G02F 1/133308 349/58 |
| 2004/0257491 A1* | 12/2004 | Kitabayashi | | G02F 1/133385 349/58 |
| 2004/0264144 A1* | 12/2004 | Rogers | | G03B 21/16 361/719 |
| 2005/0001985 A1* | 1/2005 | Kitabayashi | | G03B 21/16 353/31 |
| 2005/0007556 A1* | 1/2005 | Yanagisawa | | H04N 9/3144 353/31 |
| 2005/0012910 A1* | 1/2005 | Fujimori | | H04N 9/3105 353/119 |
| 2005/0094105 A1* | 5/2005 | Otsuka | | G03B 21/10 353/52 |
| 2005/0105054 A1* | 5/2005 | Arai | | H04N 9/3105 353/20 |
| 2005/0162760 A1* | 7/2005 | Fujimori | | H04N 9/3144 359/820 |
| 2005/0179876 A1* | 8/2005 | Iinuma | | G03B 21/16 353/119 |
| 2005/0185142 A1* | 8/2005 | Fujimori | | H04N 9/3144 353/30 |
| 2005/0185146 A1* | 8/2005 | Fujimori | | G02F 1/133385 353/61 |
| 2005/0195460 A1* | 9/2005 | Fujimori | | G02F 1/133385 359/237 |
| 2005/0270493 A1* | 12/2005 | Nakamura | | H04N 9/3144 353/31 |
| 2006/0001821 A1* | 1/2006 | Dewa | | H04N 9/3144 349/150 |
| 2006/0092382 A1* | 5/2006 | Kinoshita | | G03B 21/16 353/54 |
| 2006/0133765 A1* | 6/2006 | Miyashita | | G02F 1/133308 385/147 |
| 2006/0274412 A1* | 12/2006 | Koyama | | G02F 1/133308 359/443 |
| 2007/0056685 A1* | 3/2007 | Prochaska | | G03B 21/00 156/272.8 |
| 2007/0206158 A1* | 9/2007 | Kinoshita | | G03B 21/18 353/52 |
| 2008/0024733 A1* | 1/2008 | Gerets | | G02F 1/133553 353/52 |
| 2008/0174741 A1* | 7/2008 | Yanagisawa | | H04N 9/3144 353/31 |
| 2008/0246923 A1* | 10/2008 | Wu | | G03B 21/16 353/52 |
| 2009/0040464 A1* | 2/2009 | Utagawa | | G03B 21/2073 353/20 |
| 2009/0046425 A1* | 2/2009 | Kavanagh | | H04N 9/3144 361/695 |
| 2009/0079922 A1* | 3/2009 | Tanaka | | G02F 1/133382 349/123 |
| 2009/0207327 A1* | 8/2009 | Terao | | G02F 1/133308 349/5 |
| 2010/0091213 A1* | 4/2010 | Miyashita | | H04N 9/3144 349/58 |
| 2010/0195060 A1* | 8/2010 | Oda | | G02B 27/0006 353/52 |
| 2010/0253865 A1* | 10/2010 | Yanagisawa | | G03B 21/14 349/5 |
| 2010/0271783 A1* | 10/2010 | Miyashita | | G02F 1/133385 361/707 |
| 2010/0328621 A1* | 12/2010 | Egawa | | G03B 21/16 353/61 |
| 2011/0007281 A1* | 1/2011 | Yoshikawa | | G03B 21/16 353/52 |
| 2011/0194037 A1* | 8/2011 | Hirabayashi | | G02F 1/133308 349/5 |
| 2011/0194081 A1 | 8/2011 | Yamamoto et al. | | |
| 2011/0249205 A1* | 10/2011 | Sato | | G03B 21/145 349/5 |
| 2011/0285970 A1* | 11/2011 | Kadotani | | H04N 9/3144 353/52 |
| 2011/0310359 A1* | 12/2011 | Wakabayashi | | G02F 1/133308 353/52 |

(56) References Cited

U.S. PATENT DOCUMENTS

| | | | | |
|---|---|---|---|---|
| 2012/0013853 | A1* | 1/2012 | Kadotani | G03B 21/16 353/31 |
| 2013/0057787 | A1* | 3/2013 | Aikoh | G02F 1/133308 349/8 |
| 2013/0077058 | A1* | 3/2013 | Miyashita | H04N 9/3105 353/52 |
| 2013/0083268 | A1* | 4/2013 | Hirabayashi | G02F 1/133385 349/58 |
| 2013/0114046 | A1* | 5/2013 | Miyashita | G03B 21/16 353/52 |
| 2013/0148086 | A1* | 6/2013 | Kadotani | G03B 21/16 353/61 |
| 2013/0321778 | A1* | 12/2013 | Kanai | G03B 21/16 353/52 |
| 2014/0375964 | A1* | 12/2014 | Tsuchiya | H04N 9/3144 353/52 |
| 2015/0153611 | A1* | 6/2015 | Hirabayashi | G02F 1/133308 349/5 |
| 2015/0153612 | A1* | 6/2015 | Hirabayashi | G02F 1/133385 349/5 |
| 2015/0192845 | A1* | 7/2015 | Kadotani | G03B 21/16 353/20 |
| 2015/0229893 | A1* | 8/2015 | Miyashita | H04N 9/3105 349/5 |
| 2015/0277218 | A1* | 10/2015 | Nagatsu | H04N 9/3105 349/5 |
| 2015/0381952 | A1* | 12/2015 | Yusa | H04N 9/3144 353/52 |

FOREIGN PATENT DOCUMENTS

| | | |
|---|---|---|
| CN | 102213901 A | 10/2011 |
| CN | 102981304 A | 3/2013 |
| CN | 106200232 A | 12/2016 |
| JP | 11305674 A | 11/1999 |
| JP | 2002148617 A | 5/2002 |
| JP | 2003043442 A | 2/2003 |
| JP | 2004020603 A | 1/2004 |
| JP | 2004341180 A | 12/2004 |
| JP | 2005250249 A | 9/2005 |
| JP | 2007256500 A | 10/2007 |
| JP | 2011158823 A | 8/2011 |
| JP | 2013054145 A | 3/2013 |
| JP | 2013101236 A | 5/2013 |
| JP | 2014082202 A | 5/2014 |

OTHER PUBLICATIONS

Partial European Search Report issued in European Appln. No. 16001068.2 dated Aug. 16, 2016.

Office Action issued in Chinese Appln. No. 201610316473.1 dated Nov. 5, 2018. English translation provided.

Office Action issued in Chinese Appln. No. 201610316473.1 dated Mar. 5, 2018. English translation provided.

Office Action issued in Japanese Appln. No. 2015-099671 dated Mar. 19, 2019. English translation provided.

Office Action issued in Chinese Appln. No. 201610316473.1 dated Mar. 26, 2019. English translation provided.

* cited by examiner

FIG. 10

LIGHT MODULATION ELEMENT UNIT HAVING A LIGHT MODULATING ELEMENT AND IMAGE PROJECTION APPARATUS FOR PREVENTING FOREIGN MATTERS FROM ADHERING TO LIGHT MODULATION ELEMENT

BACKGROUND OF THE INVENTION

Field of the Invention

The present invention relates generally to a light modulation element unit used for an image projection apparatus (projector), and more particularly to a structure for preventing a foreign matter from adhering to the light modulation element.

Description of the Related Art

A projector uses a light modulation element, such as a liquid crystal panel, configured to modulate light from a light source, and can project and display an image onto a target plane, such as a screen. When foreign matters, such as dust floating in cooling air taken in a housing from the outside of the projector, adhere to a modulating plane (such as a cover glass surface) of the light modulation element, the quality of the projected image may deteriorate under influence of the foreign matters.

Japanese Patent Laid-Open No. ("JP") 11-305674 discloses a dustproof structure that arranges a first dustproof member between a base for holding the light modulation element and a light shield plate that shields light from the light source from entering a modulation area of the light modulation element, and a second dustproof member between the light shield plate and a waveplate which light toward the modulation area passes. JP 2004-020603 discloses a dustproof structure that includes a dustproof cover between a light shield plate on a light modulation element and a polarization beam splitter configured to lead light from the light source to the light modulation element.

The dustproof structures disclosed in JPs 11-305674 and 2004-020603 close the space for the light modulation element but is not sufficient because micro foreign particles can intrude from micro apertures among components in the dustproof structure and put on the modulating plane of the light modulation element.

SUMMARY OF THE INVENTION

The present invention provides a light modulation element unit and an image projection apparatus using the same, which can prevent foreign matters from adhering to a light modulation element by using a structure of collecting the foreign matters instead of a closed structure.

A light modulation element unit according to one aspect of the present invention includes a light modulation element having a light modulator configured to modulate incident light and a cover glass that covers a light incident surface of the light modulator, a light shielding member, disposed along a surface of the cover glass, which has an opening in which light going to the light modulator passes and a light shield configured to shield light that does not pass the opening, and a heat radiation member provided in a direction different from a direction of the cover glass with respect to the light modulation element. The light shielding member has an extension that extends to outside of the cover glass and faces the heat radiation member. A first gap between the extension and the heat radiation member is smaller than a second gap between the light shield and the surface of the cover glass.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 9:
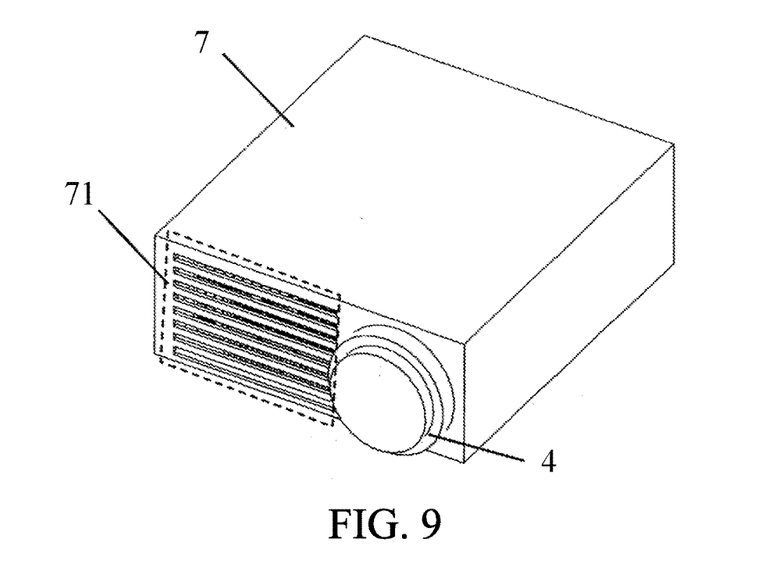
FIG. 9 is an overview of an image projection apparatus according to a third embodiment of the present invention.
Figure 10:
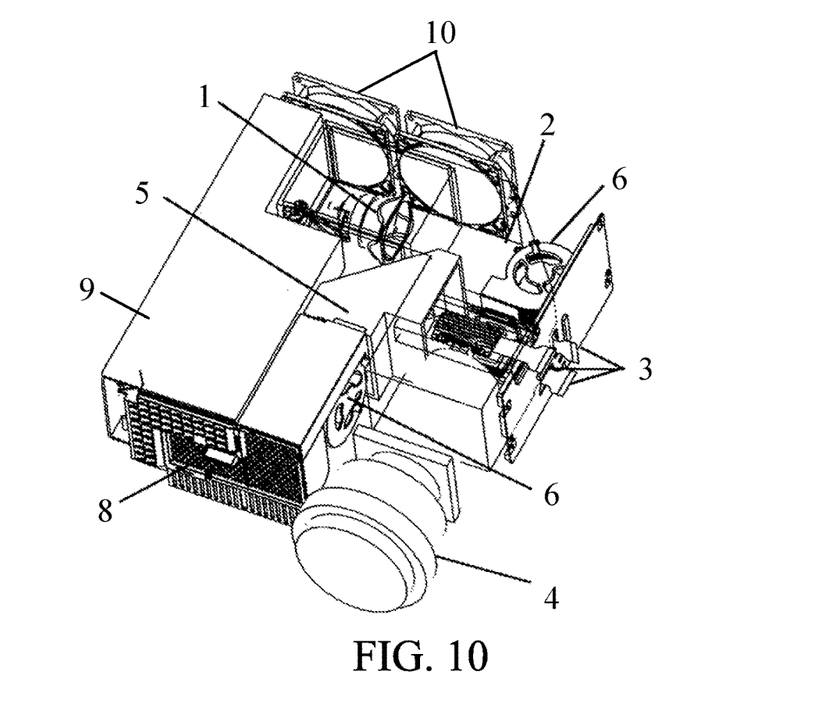
FIG. 10 is a perspective view illustrating an internal structure of the image projection apparatus according to the third embodiment.

Referring now to FIGS. 9 and 10, a description will be given of a structure of an image projection apparatus (liquid crystal projector) including a light modulation element unit according to a first embodiment of the present invention.

The liquid crystal projection includes, as illustrated in FIG. 9, an exterior case (housing) 7, and a projection lens 4 that partially projects from an opening formed in the exterior case 7. The exterior case 7 has an inlet 71 for taking (external) air into the exterior case 7 for cooling a light source, an optical system block, and a power source block housed in the exterior case 7, which will be described later.

In FIG. 10, reference numeral 1 denotes a light source (lamp), and reference numeral 2 denotes an optical system block that houses optical elements for guiding light from the light source 1 to a light modulation element (liquid crystal panel) of a light modulation element unit 3. A projection lens 4 enlarges and projects light modulated by the light modulation element, onto a target plane, such as a screen. Reference numeral 5 denotes an optical cooling duct configured to guide air for cooling a plurality of optical elements including the light modulation element, to the optical elements. Reference numeral 6 denotes a panel cooling fan configured to generate an air flow for cooling the light modulation element unit 3, and includes a sirocco fan. Reference numeral 8 denotes a dust collecting filter disposed at the inlet 71 illustrated in FIG. 9. Reference numeral 10 denotes an exhaust fan for generating an exhaust air flow through an unillustrated vent formed in the exterior case 7 from the inside of the exterior case 7. Reference numeral 9 denotes a power source block configured to generate a power source used to turn on the light source 1, to drive the light modulation element, and to rotate the fans 6 and 10.

As the panel cooling fan 6 that serves as a cooler rotates, external air passes the inlet 71 and the dust collecting filter 8, flows in the exterior case 7, and is blown on the light modulation element unit 3 through the optical cooling duct 5 (in particular, a heat radiator which will be described later). At that time, the dust collecting filter 8 collects most of the foreign particles, such as dust flowing in the external air, but particulates that have not been collected by the dust collecting filter 8 are blown on the light modulation element unit 3 with the air.

Referring now to FIGS. 1, 2, 3, and 4A, the light modulation element unit 3 will be described. In these figures, reference numeral 31 is a reflection type liquid crystal panel as the light modulation element (simply referred to as a "liquid crystal panel" hereinafter). A modulator is a rectangular effective modulation area configured to actually modulate the light incident upon the liquid crystal panel 31 using the liquid crystal. A cover glass 31a is disposed on a light incident plane of the liquid crystal panel 31. Reference numeral 38 denotes a flexible wiring substrate connected to the liquid crystal panel 31, and has wiring configured to transmit an image signal (or an electric signal based on an image signal) from a processing circuit to a liquid crystal panel 31. The flexible wiring substrate 38 is connected to a side surface when it is assumed that a plane of the light modulation element 31 on which the cover glass 31a is disposed is set to a front surface.

Reference numeral 36 denotes a heat radiator as a heat radiating member that contacts a back surface of the liquid crystal panel 31 or a surface opposite to the cover glass 31. The heat radiator 36 can use a heat sink, etc.

Reference numeral 32 denotes a light shield mask as a light shielding member disposed along the surface of the cover glass 31a. The light shield mask has a rectangular opening 32a through which light towards a light modulator of the liquid crystal panel (light emitted from the light source 1 and passing through the optical system block 2) passes, and a light shield 32b having a rectangular frame shape that shields unnecessary light that does not pass through the opening 32a around the opening 32a. The opening 32a has an opening size slightly larger than the light modulator. As illustrated in FIG. 4A that enlarges an A part in FIG. 3, there is a (second) gap G2 between a surface of the cover glass 31a and the light shield 32b of the light shield mask 32.

The light shield mask 32 has an extension 32c that extends to the outside of the cover glass 31a from the light shield 32b in a direction along the surface of the cover glass 31a (or a long side direction of the opening 32a in this embodiment). The extension 32c is provided upstream of the cover glass 31a in the air flow from the panel cooling fan 6. The extension 32c is provided opposite to the flexible wiring substrate 38 via the liquid crystal panel 31.

Figure 3:
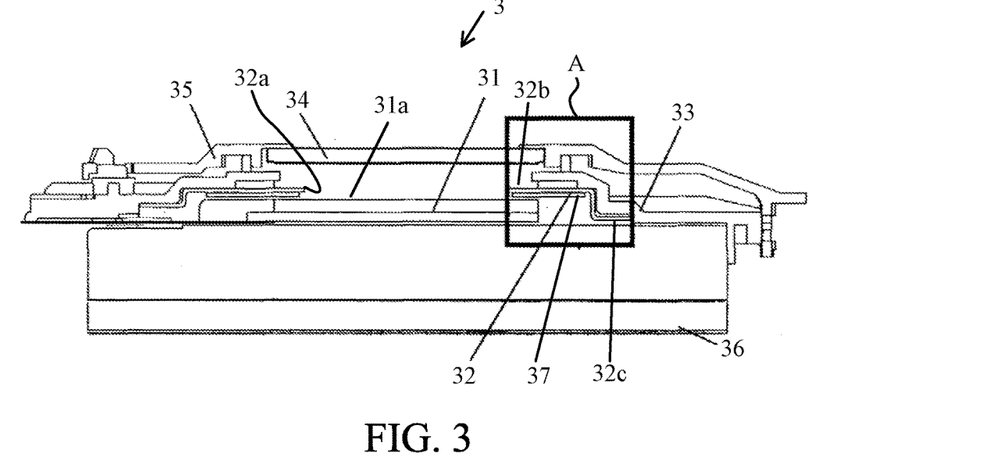
FIG. 3 is a sectional view of the light modulation element unit taken along a W-W line in FIG. 2 according to the first embodiment.
Figures 4A, 4B:
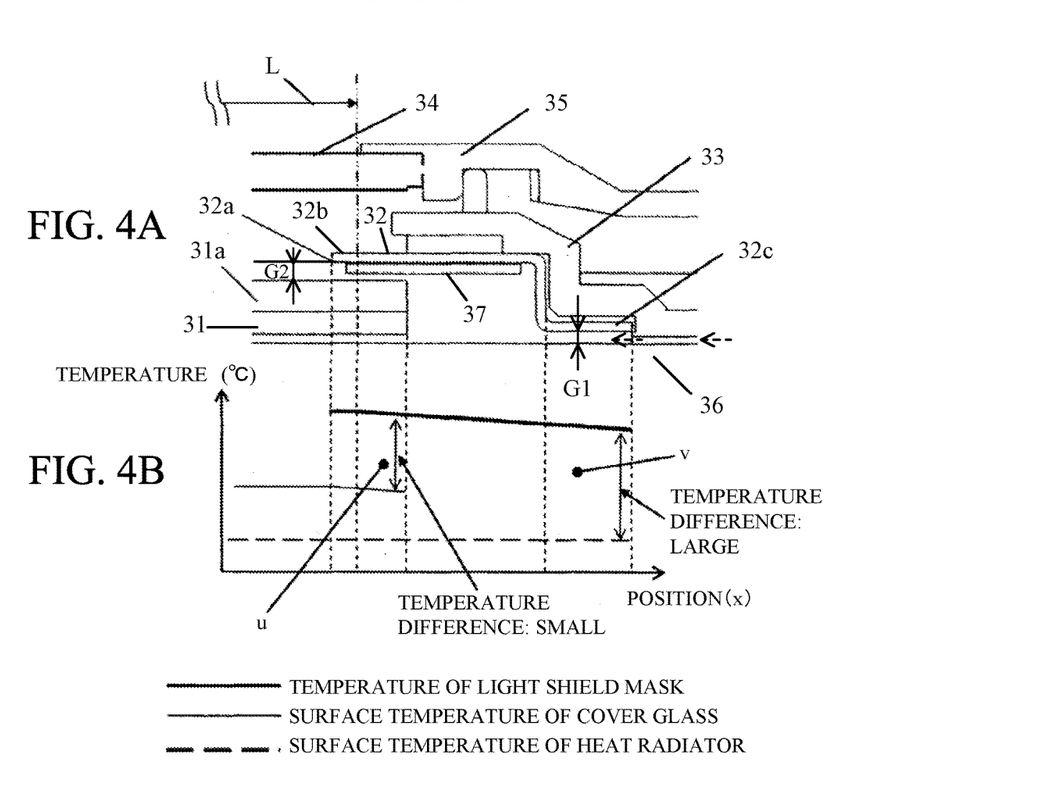
FIG. 4A is an enlarged view of an A part in FIG. 3
FIG. 4B is a graph illustrating a relationship among a light shield mask, a cover glass, and the temperature of a heat radiator in the A part.
Figure 5:
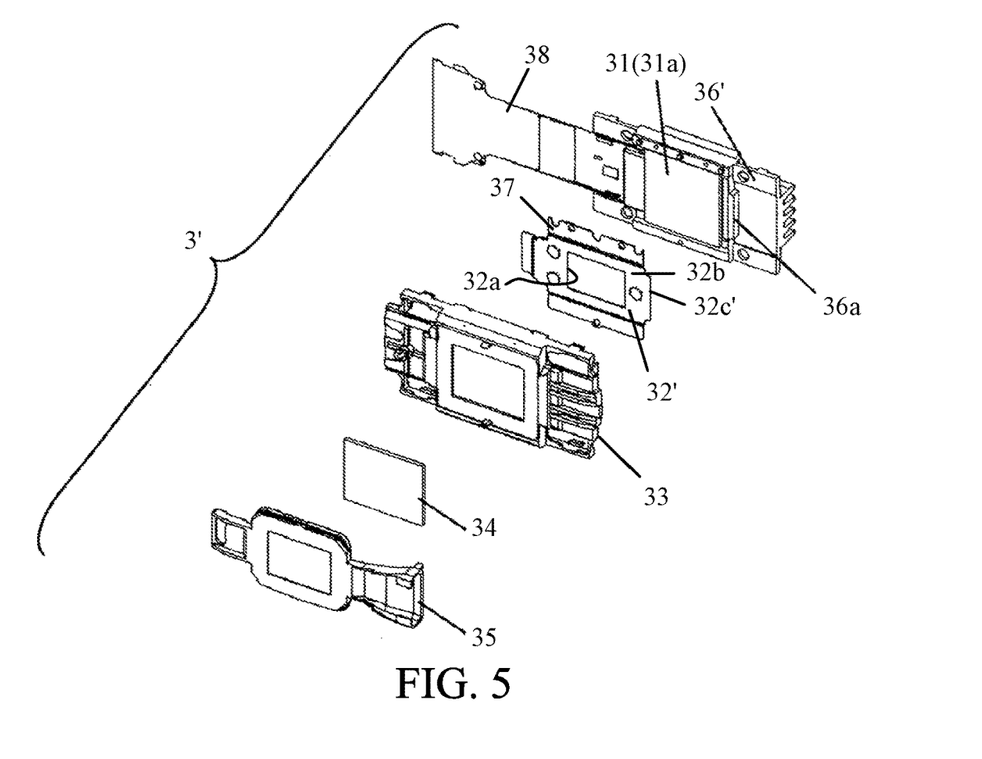
FIG. 5 is an exploded perspective view of a light modulation element unit according to a second embodiment of the present invention.
Figure 6:
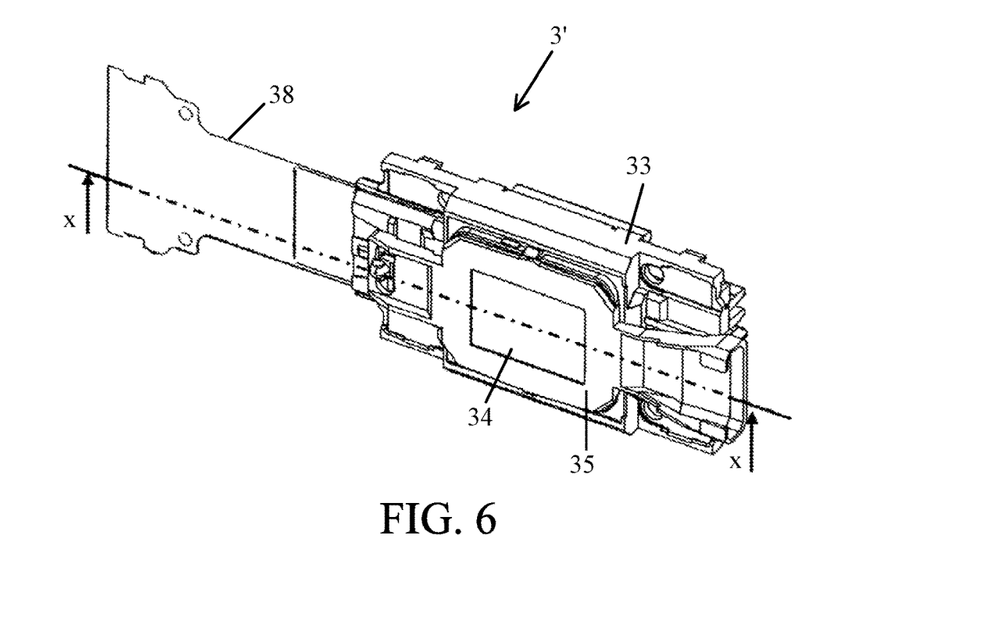
FIG. 6 is a perspective overview of the light modulation element unit according to the second embodiment.
Figure 7:
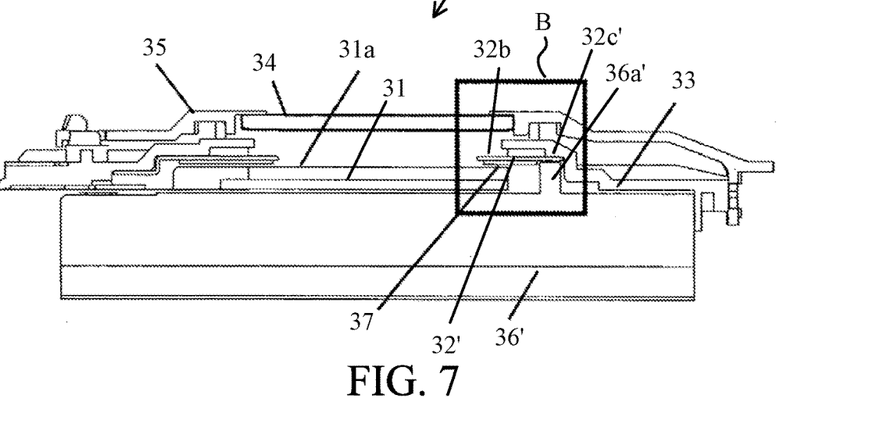
FIG. 7 is a sectional view of the light modulation element unit taken along an X-X line in FIG. 6 according to the second embodiment.

As illustrated in FIGS. 3 and 4A, the extension 32c is bent to the side of the heat radiator 36 at its root and again bent so that its tip extends along the heat radiator 36 and faces the heat radiator 36. As illustrated in FIG. 4A, there is a (first) gap G1 between the tip of the extension 32c and a surface (referred to as a "panel side surface" hereinafter) of the heat radiator 36 on the side of the light modulation element 31. The gap G1 is smaller than the gap G2.

Figure 1:
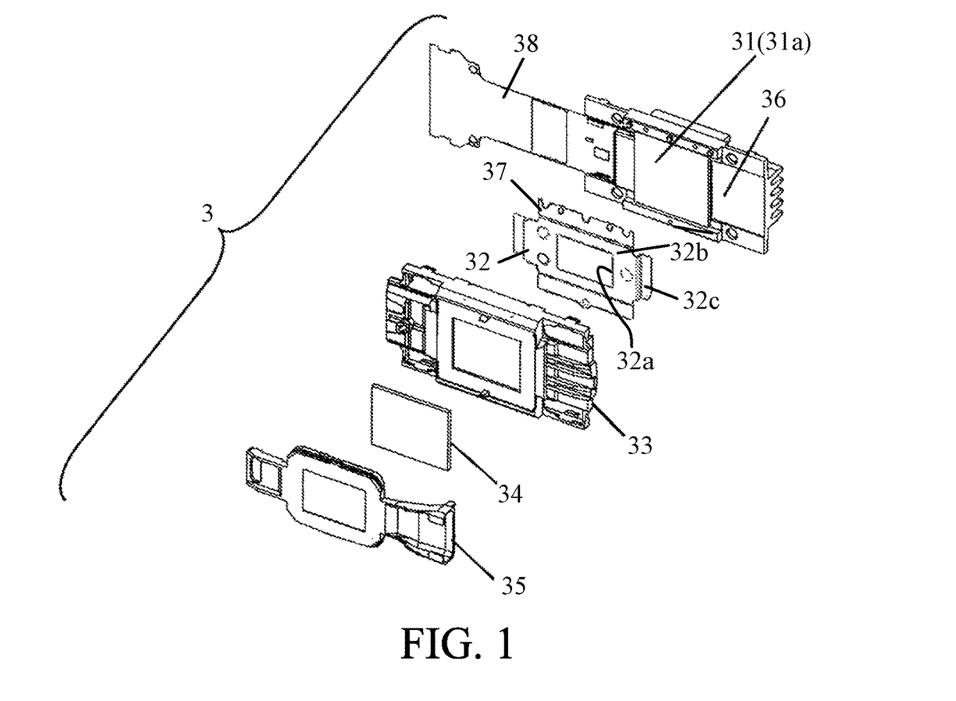
FIG. 1 is an exploded perspective view of a light modulation element unit according to a first embodiment of the present invention.
Figure 2:
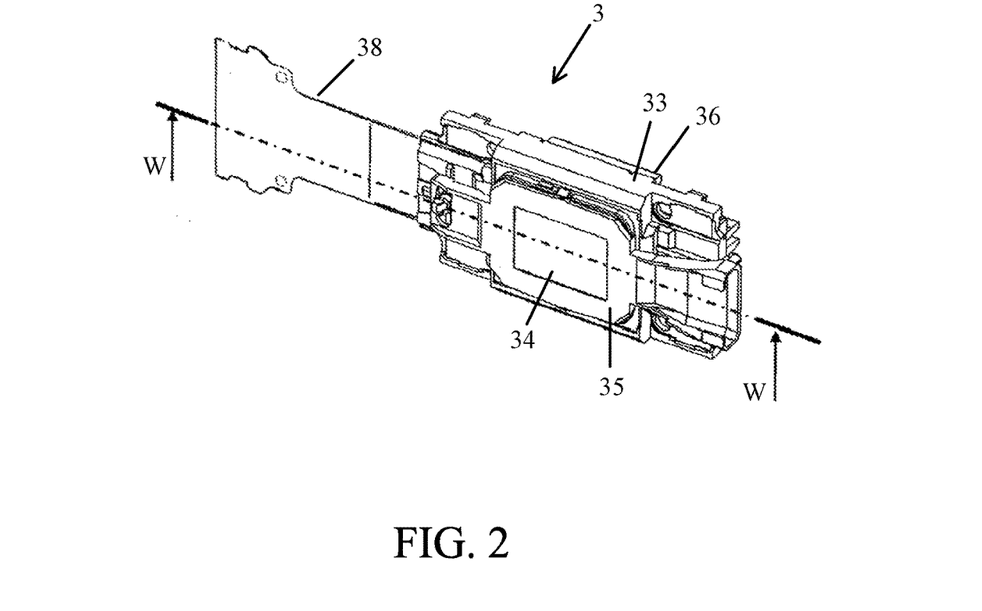
FIG. 2 is a perspective overview of the light modulation element unit according to the first embodiment.

Reference numeral 37 denotes a mask supporting plate (support member) configured to support the light shield mask 32, and coupled with the light shield mask 32 at several locations by spot welding. The mask supporting plate 37 is fixed onto the heat radiator 36 at part extending to the outside of the cover glass 31a in a direction (short side direction of the opening 32a) orthogonal to the direction in which the extension 32c of the light shield mask 32 extends along the surface of the cover glass 31a. Thereby, the light shield mask 32 is positioned relative to the liquid crystal panel 31.

Reference numeral 33 denotes a dustproof cover that contacts the heat radiator 36 and prevents the foreign matters from adhering to the surface of the cover glass 31a of the liquid crystal panel 31. Reference numeral 34 denotes a waveplate for (polarized) light that goes to the liquid crystal panel 31. Reference numeral 35 denotes a waveplate holder configured to hold the waveplate 34 in an opening larger than the opening 32a of the light shield mask 32. The waveplate holder 34 is attached rotatably to the dustproof cover 33 with respect to a light incident plane of the liquid crystal panel 31 (or a surface of the cover glass 31a), and can adjust a rotary position of the waveplate 34 relative to the liquid crystal panel 31 (modulator) when rotated.

The dustproof cover 33 is attached to the heat radiator 36 so as to hold the heat radiator 36 and thereby to approximately remove an aperture between the dustproof cover 33 and the heat radiator 36. Since the dustproof cover 33 and the waveplate holder 34 contact each other with pressure, the aperture between the dustproof cover 33 and the waveplate holder 34 is also approximately removed. The aperture is unlikely to occur or increase even when the waveplate holder 34 is rotated. This structure can restrain the foreign matter from entering the inside of the waveplate holder 34, the dustproof cover 33, and the heat radiator 36 even when a certain wind pressure of air from the panel cooling fan 6 (cooling air) is applied to them. However, it is difficult to completely eliminate the aperture between the dustproof cover 33 and the heat radiator 36, and micro foreign matters contained in the cooling wind may pass the remaining micro aperture, break in the dustproof cover 33 and move to the liquid crystal panel as illustrated by a broken-line arrow in FIG. 4A.

A graph in FIG. 4B illustrates a relationship among a position in FIG. 4A (x: abscissa axis) and temperatures (° C.: ordinate axis) of the light shield mask 32, the surface of the cover glass 31a, and the panel side surface of the heat radiator 36. A thick solid line represents the temperature of the light shield mask 32, a thin solid line represents the temperature of the surface of the cover glass 31a, and a broken line represents the temperature of the panel side surface of the heat radiator 36.

In FIG. 4A, L is a light irradiation range on the light shield mask 32 from the optical system block (or the light source 1). The light from the optical system block 2 passes the waveplate 34 and is irradiated onto part of the opening 32a and the light shield 32b of the light shield mask 32. Most of the light passes the opening 32a in the light shield mask 32 and the cover glass 31a of the liquid crystal panel and reaches the light modulator but part of the light is reflected on the light shield 32b of the light shield mask 32. As a consequence, the temperatures of the light irradiated surface of the cover glass 31 and the light shield mask 32 rise.

The light shield mask 32 is made of metal, and metal has a thermal conductivity higher than that of resin or glass, and thus the heat diffuses to the extension 32c in which the light is not irradiated. Thereby, as illustrated by the thick solid line in FIG. 4B, the temperature of the light shield mask 32 entirely rises up. On the other hand, the cover glass 31a of the liquid crystal panel 31 has a low thermal conductivity, and thus the temperature of the light irradiated area rises but the temperature of the part shielded by the light shield 32b of the light shield mask 32 does not rise. Since the glass has a high light transmittance, the temperature of the cover glass 31a is lower than that of the light shield mask 32.

The mask supporting plate 37 is attached to the heat radiator 36 and supports the light shield mask 32. The mask supporting plate 37 is made of a metal material (second material) having a thermal conductivity higher than the metal material (first material) of the light shield mask 32. As described above, the light shield mask 32 and the mask supporting plate 37 are coupled with each other at some points by spot welding, but are not thermally coupled with each other. The mask supporting plate 37 is attached to and thermally coupled to the heat radiator 36. The temperature of the light shield mask 32 rises but the temperature of the mask supporting plate 37 does not rise as the temperature of the light shield mask 32 rises.

In this temperature distribution, as described above, there is the gap G1 between the extension (tip) 32c of the light shield mask 32 and the panel side surface of the heat radiator 36 which is smaller than the gap G2 between the light shield 32b of the light shield mask 32 and the surface of the cover glass 31a. As illustrated in FIG. 4B, a temperature difference in an area v between the extension 32c of the light shield mask 32 and the panel side surface of the heat radiator 36 is larger than that in an area u between the light shield 32b of the light shield mask 32 and the surface of the cover glass 31a. In other words, a larger temperature difference is formed in the area v (the smaller gap G1) between the extension 32c of the light shield mask 32 and the panel side surface of the heat radiator 36. In other words, a temperature gradient in the area v (gap G1) is larger than that in the area u (gap G2).

When there is a stable temperature gradient maintained in the particle containing fluid between two planes, a stable concentration gradient is formed in a direction reverse to the temperature gradient. In addition, as the temperature gradient is higher, the concentration gradient is higher. Therefore, when the cooling wind contains the foreign matters, such as particulates, the particulates can be biased to the panel side surface of the heat radiator 36 on the low temperature side in the area v having a high temperature gradient, and the foreign matters can be effectively adhered to the panel side surface of the heat radiator 36. As a result, this embodiment can provide the area v with a filter function configured to collect the foreign matters, such as particulates, which go to the liquid crystal panel 31. As a result, this embodiment can effectively prevent the foreign matters from flowing and adhering to the surface of the cover glass 31a of the liquid crystal panel 31.

In this embodiment, there is a temperature gradient in the area u, and a concentration gradient may occur in this area u. This embodiment can adhere particulates to the area opposite to the light shield 32b in the surface of the cover glass 31a located on the low temperature side in the area u. As a result, even when there are uncollected foreign matters in the area v, the area u can collect them and prevent them from flowing and adhering to the area covering the light modulator on the surface of the cover glass 31a.

As described above, this embodiment can form a small gap between the extension 32c of the light shield mask 32 and the panel side surface of the heat radiator 36 and provides it with a large temperature difference, thereby effectively capturing the foreign matters flowing there. Hence, this embodiment can prevent the foreign matters from adhering to the surface of the cover glass 31a of the liquid crystal panel 31, in particular, the area that covers the light modulator, and stop the degradation of the projected image. As a result, this embodiment can provide an image projection apparatus that can maintain high image quality for a long time period even in a use environment in which there are lots of floating foreign matters, such as particulates.

Second Embodiment

FIGS. 5, 6, 7, and 8A illustrate a structure of a light modulation element unit 3' according to a second embodiment of the present invention. Those elements or components in this embodiment, which are corresponding elements in the first embodiment, will be designated by the same reference numerals, and a description thereof will be omitted.

Figures 8A, 8B:
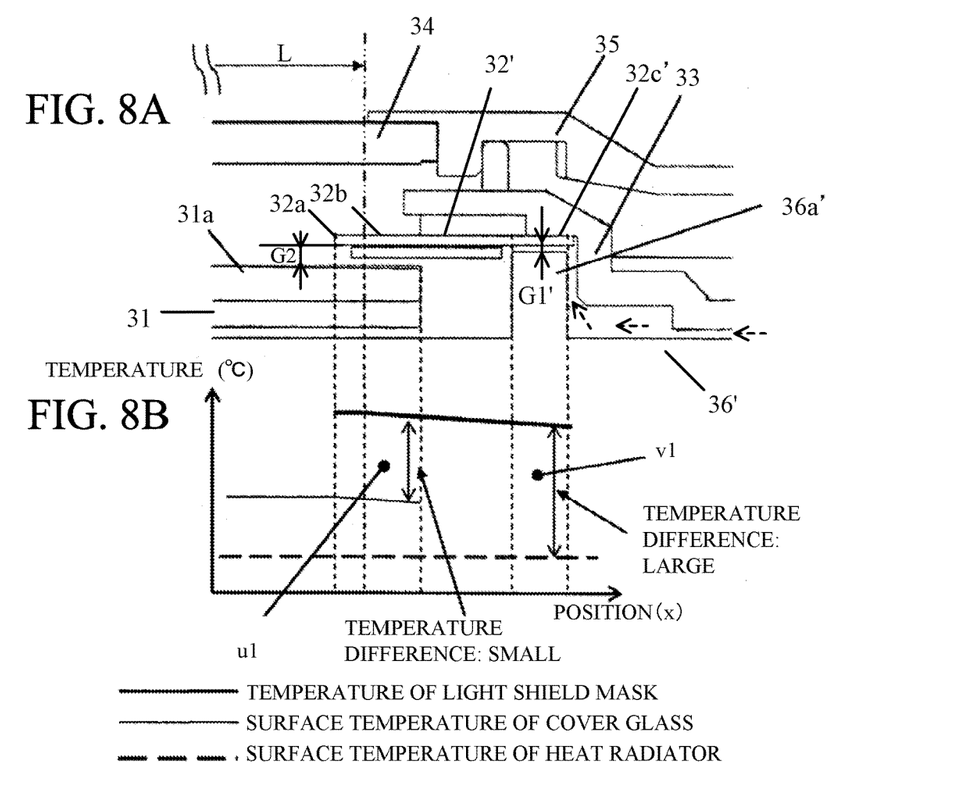
FIG. 8A is an enlarged view of an B part in FIG. 7
FIG. 8B is a graph illustrating a relationship among a light shield mask, a cover glass, and the temperature of a heat radiator in the B part.

In this embodiment, a light shield mask 32' has an extension 32c' that straight extends to the outside of the cover glass 31a from the light shield 32b in a direction (long side direction of the opening 32a) along the surface of the cover glass 31a without being bent. On the other hand, the panel side surface in a heat radiator 36' has a convex 36a' that projects towards the extension 32c' or the light shield mask (light shielding member) outside the cover glass 31a. The end planes of the extension 32c' and the convex 36a' have a (first) gap G1' as illustrated in FIG. 8A. This gap G1' is smaller than the gap G2 between the light shield 32b of the light shield mask 32' and the surface of the cover glass 31a.

Even in this embodiment, as illustrated in FIG. 8B, a temperature difference in an area u1 between the end planes of the extension 32c' of the light shield mask 32' and the convex 36a' of the heat radiator 36' is larger than that in an area v1 between the light shield 32b of the light shield mask 32' and the surface of the cover glass 31a. In other words, a large temperature difference is formed in the small gap G1' (area v1) between the end planes of the extension 32c' and the convex 36a' of the heat radiator 36'. Therefore, similar to the first embodiment, this embodiment can effectively adhere the foreign matters to the end plane of the convex 36a' of the heat radiator 36', and provide the area v1 with a filter function for collecting the foreign matters, such as particulates, which go to the liquid crystal panel. Thereby, this embodiment can effectively prevent the foreign matters from flowing and adhering to the surface of the cover glass 31a of the liquid crystal panel 31.

This embodiment can adhere particulates to the area that faces the light shield 32b on the surface of the cover glass 31a located on the low temperature side in the area u1, and can collect the foreign particles that have not been captured in the area v1.

This embodiment can also prevent the foreign matters from adhering to the surface of the cover glass 31a of the liquid crystal panel 31 (in particular the area covering the light modulator), and can prevent the deterioration of the projected image caused by the foreign matters. As a result, this embodiment provides an image projection apparatus that can maintain high image quality for a long time period even in a use environment in which there are lots of floating foreign matters, such as particulates.

Each of the above embodiments describes a reflection type liquid crystal panel for the light modulation element, but may use another light modulation element, such as a transmission type liquid crystal panel.

Each of the above embodiments may cool the heat radiator with a Peltier device to enlarge a temperature difference between the convex or the panel side surface of the heat radiator and the extension of the light shield mask. The present invention may use another method for enlarging the temperature difference between the light shield mask and the heat radiator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-099671, filed May 15, 2015, which is hereby incorporated by reference herein in its entirety.

What is claimed is:

1. A light modulation element unit comprising:
    a light modulation element having a light modulator configured to modulate incident light and a cover glass that covers a light incident surface of the light modulator and that has a first light incident surface facing the light incident surface of the light modulator and a second light incident surface positioned on an opposite side to the first light incident surface;
    a light shielding member, which is disposed along the second light incident surface of the cover glass, and has an opening through which light going toward the light modulator passes and a light shield to shield light that does not pass the opening; and
    a heat radiation member that is separate from the light shielding member provided on an opposite side of the cover glass with respect to the light modulation element,
    wherein the light shielding member further has an extension that extends to outside of the cover glass and that faces part of the heat radiation member with a first air gap,
    wherein the light shield is disposed along part of the second light incident surface of the cover glass with a second air gap,
    wherein the part of the second light incident surface of the cover glass is configured to communicate air through the first air gap and the second air gap, and
    wherein the first air gap is smaller than the second air gap.

2. The light modulation element unit according to claim 1, wherein:
    the part of the heat radiation member has a convex that projects toward the light shielding member outside the cover glass, and
    the first air gap is between the extension and the convex, and the second air gap is between the light shield and the second light incident surface of the cover glass.

3. The light modulation element unit according to claim 1, wherein:
    the light shielding member is made of a first material, and
    the light modulation element unit further includes a support member made of a second material having a thermal conductivity higher than that of the first material, and configured to support the light shielding member, and attached to the heat radiation member.

4. The light modulation unit according to claim 3, wherein the light shielding member and the support member are coupled with each other with spot welding.

5. The light modulation unit according to claim 1, wherein:
    the light modulation element has a wiring connected to a side surface when a surface where the cover glass is provided is set to a front surface, and the wiring is configured to transmit a signal to the light modulation element, and
    the extension is provided opposite to the wiring with respect to the light modulation element.

6. The light modulation unit according to claim 1, wherein a temperature gradient in the first air gap is larger than that in the second air gap.

7. The light modulation element unit according to claim 1, wherein:
    the extension is disposed closer to the heat radiation member than the light shield, and
    the first air gap is between the extension and a surface of the heat radiation member, and the second air gap is between the light shield and the second light incident surface of the cover glass.

8. The light modulation element unit according to claim 1, wherein the first air gap and the second air gap permit cooling air to flow.

9. An image projection apparatus comprising:
    a light modulation element unit comprising:
        a light modulation element having a light modulator configured to modulate incident light and a cover glass that covers a light incident surface of the light modulator and that has a first light incident surface facing the light incident surface of the light modulator and a second light incident surface positioned on an opposite side to the first light incident surface;
        a light shielding member disposed along the second light incident surface of the cover glass and has an opening through which light going toward the light modulator passes and a light shield to shield light that does not pass the opening; and
        a heat radiation member that is separate from the light shielding member provided on an opposite side of the cover glass with respect to the light modulation element,
        wherein the light shielding member further has an extension that extends to outside of the cover glass and that faces part of the heat radiation member with a first air gap,
        wherein the light shield is disposed along part of the second light incident surface of the cover glass with a second air gap,
        wherein the part of the second light incident surface of the cover glass is configured to communicate air through the first air gap and the second air gap, and
        wherein the first air gap is smaller than the second air gap; and
    an optical system configured to introduce light from a light source to the light modulation element, and project the light that is modulated by the light modulation element onto a target plane.

10. The image projection apparatus according to claim 9, further comprising:
    a cooler configured to flow air to the light modulation element unit,
    wherein the extension is provided upstream of the cover glass in a flow of the air.

11. A light modulation element unit comprising:
    a light modulation element having a light modulator configured to modulate incident light and a cover glass that covers a light incident surface of the light modulator and that has a first light incident surface facing the light incident surface of the light modulator and a second light incident surface positioned on an opposite side to the first light incident surface;

a light shielding member, which is disposed along the second light incident surface of the cover glass, and has an opening through which light going toward the light modulator passes and a light shield to shield light that does not pass the opening; and a heat radiation member that is separate from the light shielding member provided on an opposite side of the cover glass with respect to the light modulation element, wherein the light shielding member further has an extension that extends to outside of the cover glass and that faces part of the heat radiation member with a first air gap, wherein the light shield is disposed along part of the second light incident surface of the cover glass with a second air gap, wherein the part of the second light incident surface of the cover glass is configured to communicate air through the first air gap and the second air gap, and wherein a temperature gradient of the first air gap is larger than a temperature gradient of the second air gap.

12. An image projection apparatus comprising:
a light modulation element unit comprising:
  a light modulation element having a light modulator configured to modulate incident light and a cover glass that covers a light incident surface of the light modulator and that has a first light incident surface facing the light incident surface of the light modulator and a second light incident surface positioned on an opposite side to the first light incident surface;
  a light shielding member disposed along the second light incident surface of the cover glass and has an opening through which light going toward the light modulator passes and a light shield to shield light that does not pass the opening; and
  a heat radiation member that is separate from the light shielding member provided on an opposite side of the cover glass with respect to the light modulation element,
  wherein the light shielding member further has an extension that extends to outside of the cover glass and that faces part of the heat radiation member with a first air gap,
  wherein the light shield is disposed along part of the second light incident surface of the cover glass with a second air gap,
  wherein the part of the second light incident surface of the cover glass is configured to communicate air through the first air gap and the second air gap, and
  wherein a temperature gradient of the first air gap is larger than a temperature gradient of the second air gap; and
an optical system configured to introduce light from a light source to the light modulation element, and to project the light that is modulated by the light modulation element onto a target plane.

13. The image projection apparatus according to claim 12, further comprising:
a cooler configured to flow air to the light modulation element unit,
wherein the extension is provided upstream of the cover glass in a flow direction of air.

* * * * *